2,219,067

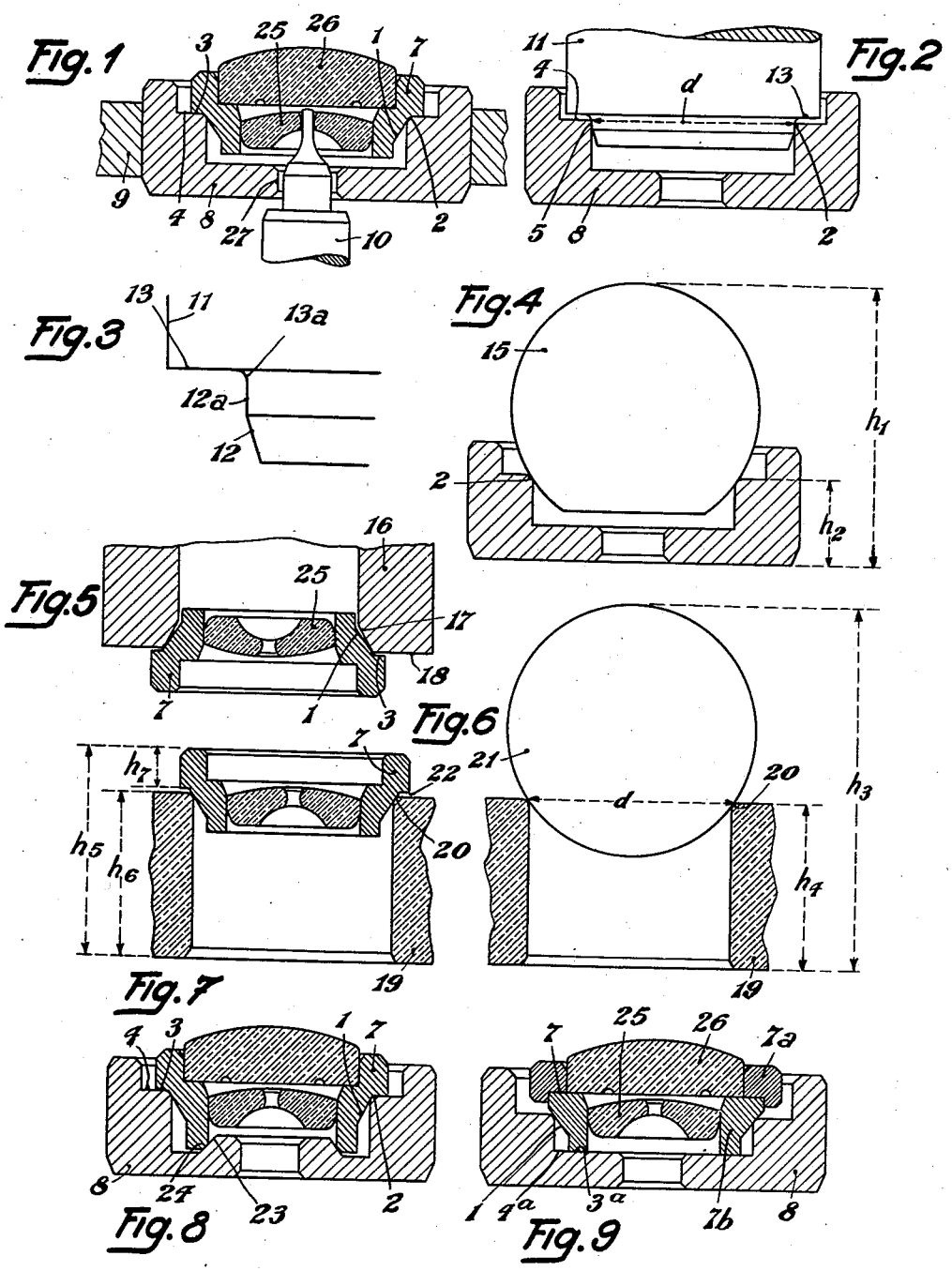
Oct. 22, 1940.     H. COLOMB     2,219,067
METHOD OF PRODUCING A PIVOT BEARING FOR WATCH MOVEMENTS
Filed June 21, 1938
H. Colomb
Inventor
By: Glascock Downing & Seebold
Attys Patented Oct. 22, 1940

UNITED STATES PATENT OFFICE 2,219,067

METHOD OF PRODUCING A PIVOT BEARING FOR WATCH MOVEMENTS

Henri Colomb, Lausanne, Switzerland

Application June 21, 1938, Serial No. 215,023
In Switzerland June 28, 1937

1 Claim. (Cl. 29—149.5)

This invention relates to a method of producing a pivot bearing for watch movements of the type comprising a movable bearing member which is loosely supported and adapted to be centered in a supporting member by means of at least two cooperating circular centering surfaces provided on the movable bearing member and on the supporting member, respectively. More particularly the invention concerns a method for producing pivot bearings for watches of the kind which are described in my copending application Ser. No. 73,765 of April 10, 1936, and of Ser. No. 215,024 filed of even date herewith.

The object of the invention is to provide a method of producing the movable bearing member and the supporting member with the highest possible accuracy and uniformity in order to obtain perfectly interchangeable members.

The method according to the invention is described hereinafter with reference to the accompanying drawing, in which:

Figure 1 is an axial section through a pivot bearing of a watch balance spindle, which is to be produced in accordance with the invention.

Figure 2 shows the manner in which the supporting member of the bearing is trued.

Figure 3 is a partial view of the profile of a punch or die for truing the supporting member, drawn to a much enlarged scale.

Figure 4 illustrates the method of inspection of the trued supporting member.

Figure 5 shows the manner in which the movable bearing member is trued.

Figure 6 shows the manner of inspecting the size of a gauge serving to control the work of the punch or die.

Figure 7 shows the gauge applied to a movable bearing member.

Figures 8 and 9 are axial sections of two modifications of a pivot bearing which can be produced by the method according to the invention.

The bearing represented in Figure 1 comprises a movable annular bearing member 7 carrying the perforated jewel 25 and the cap jewel 26, and a supporting member 8 carried by the balance wheel bridge 9. The bearing member 7 is centered in the supporting member 8 by means of a conical surface 1 provided on this bearing member and cooperating with a circular slightly bevelled edge 2 provided on the supporting member, and moreover by means of a transverse abutting surface 3 provided on said bearing member and bearing against a transverse abutting surface or shoulder 4 of said supporting member.

In order to produce this bearing, the bearing member 7 and the supporting member 8 are first rough-machined on a precision lathe, within manufacturing tolerances as are usual with machines of this kind, for example with a precision of about several hundredths of one millimeter. The bearing member 7 must always be centered in the supporting member 8 by the cooperating circular centering elements. That is to say, there must be no lateral play when a bearing member 7 of minimum tolerated dimension is placed on a supporting member 8 the circular edge 2 of which has the maximum dimension. When this condition is satisfied, it follows that the axial distance between the transverse abutting surfaces 3 and 4 will vary between limits corresponding to the admitted tolerances, and that this distance will be a maximum when a bearing member 7 of maximum dimension is placed on a supporting member 8 of minimum dimension. In order to reduce these tolerances practically to zero, the two members 7 and 8 are rectified or trued. The supporting member 8 is trued by means of a punch or die 11 (Figs 2 and 3) provided with a conical centering surface 12, a cylindrical surface 12a, a transverse base surface 13 and a rounded edge 13a between the two surfaces 12a and 13. Tools of this kind can be made with a precision of the order of one thousandth of one millimeter. This die is pressed into the rough machined supporting member 8 until its base surface 13 makes contact with the transverse abutting surface 4. This abutting surface is also used to force the supporting member 8 into the bridge 9 and to adjust the axial position of said supporting member. When the two surfaces 13 and 4 arrive in contact, the cylindrical portion 12a has trued the corresponding wall portion 5 of the supporting member, and the rounded edge 13a has forged the edge 2 of said supporting member, on which the bearing member 7 will afterwards be centered by means of its conical surface 1. Any desired shape can be given to the edge 2 by modifying the contour of the die 11 accordingly.

It will be understood that the edge 2 can be trued with an extremely high precision, to the order of one thousandth of one millimeter, since the punching action of the die 11 can be easily inspected, as shown in Fig. 4, by using a control ball 15 the diameter of which can be determined with any desired precision. When this ball is placed on the edge 2, the total height $h_1$ of the ball and the supporting member can be measured with a precision micrometer. The exact value of this height can be calculated in advance and depends upon the height $h_2$ of the supporting member and of the diameter of the ball. According to the value of the measured distance $h_1$, the die 11 will be modified or replaced by another one, and will be used only for the production of the supporting members after it has been proven to be exact. The supporting member 8 could be integral with the bridge 9 or with the movement plate of the watch movement, but the method of truing the part in which this supporting member is formed would naturally be the same.

The bearing member 7 is also first machined on a precision lathe, and then the perforated jewel is introduced in this member before the truing operation, because the insertion of the jewel slightly alters the shape of this member. After the insertion of the jewel, the bearing member 7 is trued by means of a die 16 which is provided with a conical surface 17, the angle at the vertex of the cone of this surface being slightly smaller than the angle of the cone of the surface 1, for example 65° when the cone of the surface 1 has 70°. The die 16 is further provided with a transverse base surface 18. When this surface 18 arrives in contact with the transverse surface 3 of the bearing member 7, the portion of the conical surface 1 coacting with the supporting member 8 has been trued to a degree of precision depending on the precision of the die. In order to determine the accuracy of the truing operation, a gauge 19 is used which is made of hard material, for example of watch jewel material. The circular edge 20 of this gauge has the exact diameter $d$ and shape which the edge 2 of the supporting member 8 is supposed to have after truing. The precision of the gauge is determined by means of a ball 21 having the same diameter as the ball 15. When this ball is placed on the edge 20 of the gauge, the heights $h_3$ and $h_4$ will be measured. The difference between these two distances must be the same as the difference between $h_1$ and $h_2$ in Figure 4.

In order to control the precision of the truing operation on the bearing member 7, this latter is placed on the gauge 19 as shown in Fig. 7. When the die 16 is exact, there must be no play at 22 between the member 7 and the gauge, or the height $h_5$ measured with a precision tool must have a certain predetermined value, calculated from the height $h_6$ of the gauge and the height $h_7$ of the member 7.

When truing the bearing member 7 and the supporting member 8 by means of die stamping operations as described, using the transverse abutting surfaces of these members as limiting surfaces for the stamping operation, the precision of said members will be such that they are readily interchangeable, which is an important improvement for the manufacturing process as also for repairing a watch, because when one of said members must be replaced, it is not therefore necessary to change the entire bearing.

Owing to the transverse abutting surfaces 3 and 4 of the bearing member and the supporting member, respectively, the perforation in the jewel 25 will be truly coaxial with the hole 27 of the supporting member 8 through which passes the pivot of the spindle 10, because during normal operation, these transverse surfaces prevent any inclination of the movable bearing member 7, even if the shock absorbing springs which act on this member, do not act in a true axial direction.

For this reason, the play between the spindle 10 and the wall of the hole 27 can be reduced to a minimum, and when, owing to a lateral shock, the spindle abuts against the wall of the hole, the lateral displacement of the spindle has not been so great as to be prejudicial for the operation of the members of the escapement, when it is supposed that the spindle 10 is a balance spindle.

The described method can also be used for truing the bearings according to Figs. 8 and 9. The bearing shown in Fig. 8 is provided with the two transverse abutting surfaces 3 and 4 and with the conical surface 1 and the rounded edge 2. There are provided moreover two further coacting centering elements, namely a conical surface 23 formed on the supporting member 8, and a bevelled edge 24 formed at the bottom end of the bearing member 7. Owing to the provision of two pairs of centering surfaces, 1 and 2, and 23, 24, the bearing member 7 will be raised relative to the supporting member 8 and parallel to itself, when the bearing is subjected to a shock.

In order to true the supporting member 8 of the bearing according to Fig. 8, the edge 2 is trued by means of a first die, using as limiting stop for the stamping operation the transverse surface 4. Afterwards the surface 23 is trued by means of a second die still using the transverse surface 4 as limiting stop for this second stamping operation. The conical surface 1 of the bearing member 7 is trued by means of a first die, and the bevelled edge 24 by means of a second die, the movement of both dies being limited by the transverse surface 3 of the member 7.

The bearing according to Fig. 9 comprises a bearing member 7 which is formed of two portions 7a and 7b, the first one carrying the cap jewel 26 and the second the perforated jewel 25. The transverse abutting surfaces 3a and 4a are formed by the end face of the portion 7b and by the bottom face of the supporting member 8. This bearing can be trued in the same manner as that according to Fig. 1. For the movable bearing member only the portion 7b must be trued, which is provided with the conical surface 1, the transverse end face 3a being used as limiting surface for the stamping operation of the die.

I claim:

In a method of producing a watch movement bearing comprising a supporting member with an internal cylindrical wall portion, and a movable annular bearing member centered in said supporting member by means of two co-operating circular centering surfaces provided on the supporting member and on the bearing member, respectively, and by means of two coacting transverse abutting surfaces provided on said supporting member and said bearing member, respectively, and extending transversely relative to the axis of the bearing; the process consisting in rough machining the supporting member and in pressing a die having a conical centering surface, a cylindrical surface, a rounded edge and a transverse base surface into said rough machined supporting member until its base surface reaches the transverse abutting surface of said member, for truing the cylindrical wall portion of the supporting member by means of the cylindrical surface of the die, and for forging the circular centering surface of said supporting member by means of the rounded edge of said die so as to conform said centering surface to the circular centering surface, preferably of conical shape, of the bearing member; and the process further consisting in machining the bearing member, in mounting therein the perforated jewel, in introducing the bearing member carrying the perforated jewel into a circular die provided with a transverse base surface and an internal conical surface, the angle at the vertex of the cone of this surface being slightly smaller than the angle of the cone formed by the circular centering surface of the bearing member, and in forcing said bearing member completely into said die until the transverse base surface of the latter arrives in contact with the transverse abutting surface of said bearing member, for truing the cone of the circular centering surface of said bearing member by means of the conical surface of the die.

HENRI COLOMB.